March 8, 1966  I. B. JOHNS ETAL  3,239,561
NITROGENOUS PHOSPHORUS COMPOUNDS
Filed Oct. 27, 1961
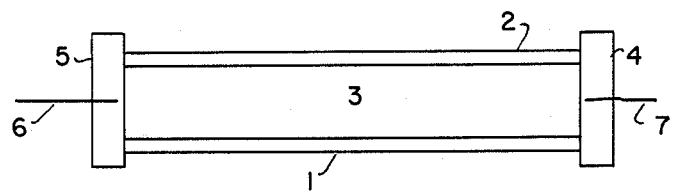
INVENTORS.
IRAL B. JOHNS
BERNARD S. WILDI
BY
*Edward L. Doerr*

3,239,561
NITROGENOUS PHOSPHORUS COMPOUNDS
Iral B. Johns, Marblehead, Mass., and Bernard S. Wildi, Dayton, Ohio, assignors to Monsanto Company, a corporation of Delaware
Filed Oct. 27, 1961, Ser. No. 151,131
8 Claims. (Cl. 260—551)

This invention relates to organic nitrogenous phosphorus compounds and more particularly provides certain hydrocarbon-substituted 2,4,6-s-triphospha-s-triazines as new and valuable compounds, the method of preparing the same, and thermistors in which the new compounds are employed as electric current resistors.

Thermistors are electric current resisting elements made of a semi-conducting material which exhibits a high negative temperature coefficient of resistivity. It is well known in the art to employ certain inorganic materials as thermistor elements, e.g., the oxides of nickel, copper and zinc have been used for this purpose. However, few if any, organic materials have been previously used for this purpose. For many reasons, e.g., for easy fabrication of the thermistor component and for better control of the manufacturing process to obtain reproducibility insofar as sensitivity and stability is controlled, organic materials are preferable.

Accordingly, an object of the present invention is the provision of organic compounds having semiconducting properties. Another object is the provision of an organic compound having a high negative temperature coefficient of resistivity to electric current. Still another object of the invention is the production of heterocyclic compounds having nuclear phosphorus and nuclear nitrogen. A further object is the provision of the heterocyclic triphosphatriazines from readily available, aromatic phosphorushalogen compounds and aromatic or alkylaromatic mono-amines. A very important object is the provision of organic thermistors. A further object is the provision of new and useful electrical current regulating devices. Another object of this invention is to provide new and useful thermoregulating devices. These and other objects of the invention will become apparent as the detailed description of the invention proceeds.

It has been found that heterocyclic compounds having nuclear phosphorus and nitrogen and processing semiconducting properties are obtained by the reaction of certain organic phosphonous dichlorides with certain organic amines, substantially according to the scheme

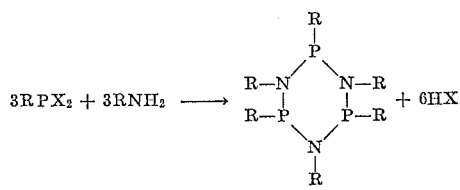

in which R is selected from the class consisting of phenyl and alkylphenyl having from 1 to 5 carbon atoms in the alkyl radical and X is a halogen selected from the class consisting of chlorine and bromine.

When R and R' are both the phenyl group, and the reactants are phenylphosphonous dichloride or dibromide and aniline, the product is hexaphenyl-2,4,6-triphospha-s-triazine. The lower alkyl-substituted phenylphosphonous dichlorides or dibromides or the nuclearly alkyl-substituted anilines react similarly. Thus, reaction of o, m, or p-tolylphosphonous dichloride and aniline give 1,3,5-triphenyl-2,4,6-tri-(o-, m- or p-tolyl)-2,4,6-triphospha-s-triazine; phenylphosphonous dibromide and o-, m-, or p-toluidine give 1,3,5-tri(o-, m- or p-tolyl)-2,4,6-triphospha-s-triazine; o-, m- or p-tolylphosphonous dichloride and o-, m- or p-toluidine give hexa-o-, m- or p-tolyl-2,4,6-triphospha-s-triazine, p-ethyl- or p-isopropylphosphonous dichloride and aniline give 2,4,6-tris(p-ethylphenyl)- or 2,4,6-tris(p-isopropylphenyl) - 1,3,5 - triphenyl-2,4,6-triphospha-s-triazine, p-butylphenylphosphonous dibromide and p-butylaniline give hexakis(p-butylphenyl)-2,4,6-triphospha-s-triazine, p-amylphenylphosphonous dichloride and p-propylaniline give 2,4,6-tris(p-amylphenyl)-1,3,5-tris(p-propylphenyl) -2, 4,6 - triphospha-1,3,5-s-triazine, 3,4-diethylphenylphosphonous dichloride and 3,4-diethylaniline give hexakis(3,4-diethylphenyl) - 2,4,6-triphospha-s-triazine, and pentamethylphenylphosphonous dichloride and 2,3,4,5,6-pentamethylaniline give hexakis-(pentamethylphenyl)-2,4,6-triphospha-s-triazine.

Reaction of the phenyl- or alkyl-substituted phosphonous dichloride or dibromide and aniline or nuclearly alkylated aniline takes place readily, at ordinary or increased temperatures, by simple mixing together the two reactants in the presence or absence of an inert solvent or diluent. Since the reaction takes place with evolution or hydrogen halide, provision is advantageously made for removal of the halide as it is formed. This may be done by dephlegmation and/or vigorous agitation, but is generally more expeditiously effected by operating in the presence of a basic compound as hydrogen chloride scavenger, e.g., the alkali metal or alkaline metal hydroxides such as sodium or potassium hydroxide, quaternizing nitrogen compounds such as the heterocyclic nitrogen bases or the tertiary alkylamines, e.g., pyridine, quinoline, trimethylamine, triethylamine, etc. Solvents which are presently useful include the aliphatic or aromatic liquid hydrocarbons such as hexane, benzene, xylene, mineral spirits, chlorinated hydrocarbons such as hexachloroethane, ketones such as 2-butanone, ethers or sulfoxides such as dioxane or dimethyl sulfoxide or diethylene glycol dimethyl ether, etc.

Since reaction of the phosphonous dichloride with the amine compound takes place very readily, a solvent is generally recommended in order to effect smooth reaction, and initial mixing of the two reactants is advantageously conducted either at room temperature or with cooling. In order to accelerate completion of the reaction, the reaction mixture may be heated at, say, the temperatures of from 60° C. to 150° C., and advantageously at reflux.

Since condensation of the phosphonous dihalide with the amino compound to give the present 2,4,6-triphospha-s-triazine compounds proceeds by participation of 3 moles of the dihalide with 3 moles of the amine, the two reactants are advantageously employed in such stoichiometric proportions; however, any excess of either reactant may be used, since any unreacted material can be separated from the desired product. Also, if a scavenger for the hydrogen halide be employed, for good yields of the desired product the scavenger preferably is employed in a ratio calculated to be consumed by reaction with the quantity of hydrogen halide evolved; although, of course, use of physical means of removing the hydrogen halide from the reaction zone employed in conjunction with the chemical scavenger will diminish the optimum amount of the scavenger. When using an amine as scavenger, the quaternary ammonium compound which is formed is generally insoluble in the organic diluent. Hence, it can usually be separated from the diluent, in which the reactants and product are generally soluble, by filtration or decantation. The 2,4,6-triphospha-s-triazine product can then be recovered by methods known to those skilled in the art, e.g., by distilling off the solvent and any unreacted material, by fractional crystallization, solvent extraction, etc.

The presently provided hexaphenyl-2,4,6-triphospha-s-triazine and the lower alkyl derivatives thereof are stable, high-melting compounds which find application for a variety of industrial purposes; but owing to the unique property of the present compounds to resist the flow of electrical current at low temperature while permitting current flow at higher temperatures, the triphospha-s-triazines of this invention are particularly suitable for the manufacture of thermistors designed for use in measurement and control apparatus, e.g., temperature and volume regulating means, oscillators, high frequency power meters, etc.

One of the fundamental differences between most inorganic materials, e.g., metals and semiconductors is the effect of temperature on resistivity. Metals show a slight increase in resistivity with increasing temperature, while semiconductors show an inverse effect of much greater magnitude. The resistivity of inorganic semiconductors follow the relationship $\rho=\rho_0 \exp-\Delta E/kT$ where $\rho$ is the resistivity, $\rho_0$ a constant, $\Delta E$ the energy gap between the valence band and conduction band and $kT$ the product of the Boltzmann constant and absolute temperature. If one plots the log of the resistivity ($\rho$) versus the reciprocal of the absolute temperature ($1/T$), a straight line is obtained. The slope of this line is ($\Delta E/k$) and the intercept on the $1/T$ axis is long $\rho_0$. Experimentally obtained data obtained with inorganic semiconductors fit the Arrhenius equation. The presently provided 2,4,6-triphospha-1,3,5-triazines are resistors whose temperature variation of resistance is large enough for useful application. They show the same behavior as do the inorganic thermistors, with increasing temperature resulting in an exponentially decreasing resistivity.

The invention is further illustrated by, but not limited to, the following examples.

Example 1

Into a 500 ml., 3-necked, round-bottomed flask, equipped with stirrer, reflux condenser, dropping funnel, and nitrogen inlet tube, were placed 9.31 g. (0.1 mole) of aniline and 25 g. of triethylamine in 300 ml. of freshly distilled benzene which had been dried over sodium. The system was continually swept with dry nitrogen while 17.9 g. (0.1 mole) of freshly distilled phenylphosphonous dichloride was added dropwise, with constant stirring and cooling to 0° C. Immediate precipitation of by-product triethylamine hydrochloride was evident. After all of the phenylphosphonous dichloride had been added, the whole was refluxed for 1.75 hours. It was then allowed to cool to room temperature and filtered to remove the amine hydrochloride. The filtered solid was washed with benzene, and the combined washings and filtrate were refluxed for 2 hours, after which time the benzene was stripped off at atmospheric pressure. Successive concentrations and filtrations gave as the third crop of crystals the substantially pure hexaphenyl-2,4,6-triphospha-s-triazine, M.P. 262–265° C. and analyzing 14.97% phosphorus and 7.16% nitrogen as against 15.57% and 7.03% the respective calculated values for $C_{12}H_{10}PN$. Cryoscopic molecular weight determination in benzene gave a molecular weight of 590. Testing of the heat stability of the compound in the micro isoteniscope showed it to be stable below 391° C.

Example 2

Employing the equipment described in Example 1 and working under nitrogen, 53.70 g. (0.3 mole) of phenylphosphonous dichloride was added dropwise, with cooling, to a mixture consisting of 27.94 g. (0.3 mole) of aniline, 65 g. (0.6+ mole) of triethylamine and 600 g. of benzene. The whole was then refluxed for a total of 4 hours, allowed to cool, and filtered. The yellow filtrate was concentrated at atmospheric pressure to 180 ml. and allowed to stand overnight. The solids were filtered off and the filtrate was subjected to three successive concentrations and filtrations. There was thus obtained as the fourth crop of crystals the substantially pure hexaphenyl-2,4,6-triphospha-s-triazine, a high-melting, yellow crystalline solid.

Example 3

Testing of the semiconductor properties of hexaphenyl-2,4,6-triphospha-s-triazine was conducted as follows:

The temperature resistivity measurements were made in a ¾″ diameter cylindrical quartz cell, the thickness of which could be varied from 0.7 to 5 mm. The quartz cell was fitted with a heater, platinum electrodes and a thermocouple. The cell was covered by a bell jar connected to a gas inlet and vacuum system. The sample of said triphosphatriazine in powdered form was annealed for 2 hours at 90° C. and placed in the cell holder, and the electrodes atached under a constant spring tension. The bell jar system containing the sample in the cell was evacuated and flushed out with anhydrous nitrogen. The resistivities were determined with a megaohm bridge (having a range of $10^7$–$10^{12}$ ohm) at decreasing temperatures. Eleven determinations were made within a temperature range of 50° C. to 111° C. Plotting of the log resistivity-reciprocal temperature data gave a straight line curve, with a resistivity of $2 \times 10^{11}$ ohm-cm. at one temperature extreme and a resistivity of $8 \times 10^6$ ohm-cm. at the other. The log of the resistivity was plotted against $1000/T$ and from this energy gap $\Delta E$ was arrived at by the Arrhenius equation to be $\Delta E=2.49$. The intercept log $\rho_0$ value was found to be $1.1 \times 10^{-27}$.

The data obtained for hexaphenyl -2,4,6-triphospha-s-triazine is surprising, for the analogous hexaphenylbenzene showed entirely different resistivity. Thus, using the same testing procedure, at a temperature of 60° C., hexaphenyl-2,4,6-triphospha-s-triazine showed a resistivity of $10^{11}$ ohm-cm., whereas hexaphenylbenzene showed a resistivity of $10^{16}$ ohm-cm. The five orders of magnitude difference between the phosphorus on the one hand and the carbon analogue on the other leads to the conclusion that the cyclic —P—N— system shows less resistance to the conduction of an electron or of its opposite, the hole, than does the cyclic —C=C— system. This is probably due to a stereoisomeric positioning of the phenyl radical with respect to the nuclear phosphorus of the triphosphatriazine system.

The invention provides thermistors comprising hexaphenyl-2,4,6-triphospha-s-triazine or an alkyl-substituted derivative thereof in contact with a pair of electric current conductors. Thermistors comprising the present compounds may be made by forming a compact, rigid tablet or wafer of the compound, volatilizing a metal, e.g., gold, upon portions of the surface thereof to serve as contact, and positioning wire leads therein. An alternative thermistor construction comprises a bead of the triphospha-s-triazine compound held between two wires which serve as leads and, if desired, sealed in glass or other siliceous material. The granular or powdered triphosa-s-triazine compound may be melted and allowed to fuse around a pair of electrode tips to provide a very easily manufactured thermistor. Also, pills of the present compound may be formed, covered with a silver-base glaze, and baked or covered with a silicon-base varnish after the leads are soldered on the coated pills. The presently provided triphosphoratriazine compounds may likewise be encapsulated in a plastic film, e.g., a film of polyethylene, polyvinyl chloride, nylon or tetrafluoroethylene polymer and provided with circuit means intimately surrounded by the triphosphatriazine and projecting externally. A laminate thermistor comprising one or more of the present compounds is shown in the attached drawing, wherein numerals 1 and 2 depict ceramic or glass sheets, numeral 3 depicts compacted hexaphenyl-2,4,6-triphospha-s-triazine or a lower alkyl derivative thereof, numerals 4 and 5 are metal contacts which may be of silver or gold, and numerals 6 and 7 are wire leads. Thermistors comprising the present compounds are also easily constructed by placing the granulated or powdered compounds in a hollow rigid casing which may be of ceramic or glass and through which leads are interposed and placed in intimate contact with the presently provided semiconducting compounds.

In manufacture of the presently provided thermistors, the triphosphatriazine compound may be used alone as the only semiconducting component or it may be admixed with known materials which exhibit a high negative temperature coefficient of resistivity. Also, the present compounds may be mixed and pressed with sodium silicate or combined with resinous materials, especially the polymeric silicones, to give rigid structures in wafer, rod, or tablet form.

What we claim is:

1. A compound of the formula

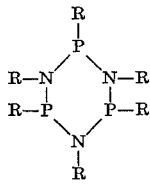

in which R is selected from the class consisting of phenyl and alkyl phenyl having from 1 to 5 carbon atoms in the alkyl radical.

2. Hexaphenyl-2,46-triphospha-s-triazine.

3. The process which comprises contacting a phosphorus halogen compound of the formula RPX₂ where R is selected from the class consisting of phenyl and alkylphenyl having from 1 to 5 carbon atoms in the alkyl radical and X is selected from the class consisting of chlorine and bromine with an amine of the formula RNH₂ where R is as above defined, heating the reaction mixture at a temperature in the range of 60° C. to 150° C. to complete the reaction, and recovering from the resulting reaction product a compound of the formula

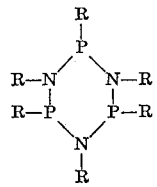

wherein R is as above defined.

4. The process defined in claim 3 further limited in that the reaction is conducted in the presence of a basic compound as hydrogen halide scavenger.

5. The process defined in claim 3 further limited in that the reaction is conducted in the presence of an inert diluent and a basic compound as hydrogen halide scavenger.

6. The process which comprises contacting phenylphosphonous dichloride with aniline, heating the reaction mixture at a temperature in the range of 60° C. to 150° C. to complete the reaction, and recovering hexaphenyl-2,4,6-triphospha-s-triazine from the resulting reaction product.

7. The process defined in claim 6 further limited in that the reaction is conducted in the presence of a tertiary alkylamine as hydrogen chloride scavenger.

8. The process defined in claim 6 further limited in that the reaction is conducted in the presence of an inert diluent and a tertiary alkylamine as hydrogen chloride scavenger.

References Cited by the Examiner

UNITED STATES PATENTS

| | | | |
|---|---|---|---|
| 2,744,988 | 5/1956 | Tierman | 338—273 |
| 2,845,515 | 7/1958 | Anderson et al. | 338—273 |
| 3,098,871 | 7/1963 | Bezman | 260—551 |

OTHER REFERENCES

Houben-Weyl: "Methoden der Organischen Chemie," 4th ed., Band XIII/I, pages 213–214 and 335 to 337, Georg Thieme Verlag, Stuttgart, Germany (1963).

Michaelis: Annalen der Chemie, vol. 270, pages 110–111 and 129 (1892).

Michaelis: Annalen der Chemie, vol. 293, pages 193–194 and 202–204 (1896).

Michaelis: Annalen der Chemie, vol. 315, pages 55–56 and 61–62 (1901).

Shaw et al.: Chemical Reviews, vol. 62, pages 247 to 252 and 276–277 (June 1962).

WALTER A. MODANCE, *Primary Examiner.*

IRVING MARCUS, *Examiner.*